Dec. 8, 1964   R. H. SHENK ETAL   3,159,946
LAPPING MACHINE
Filed April 26, 1962   2 Sheets-Sheet 1
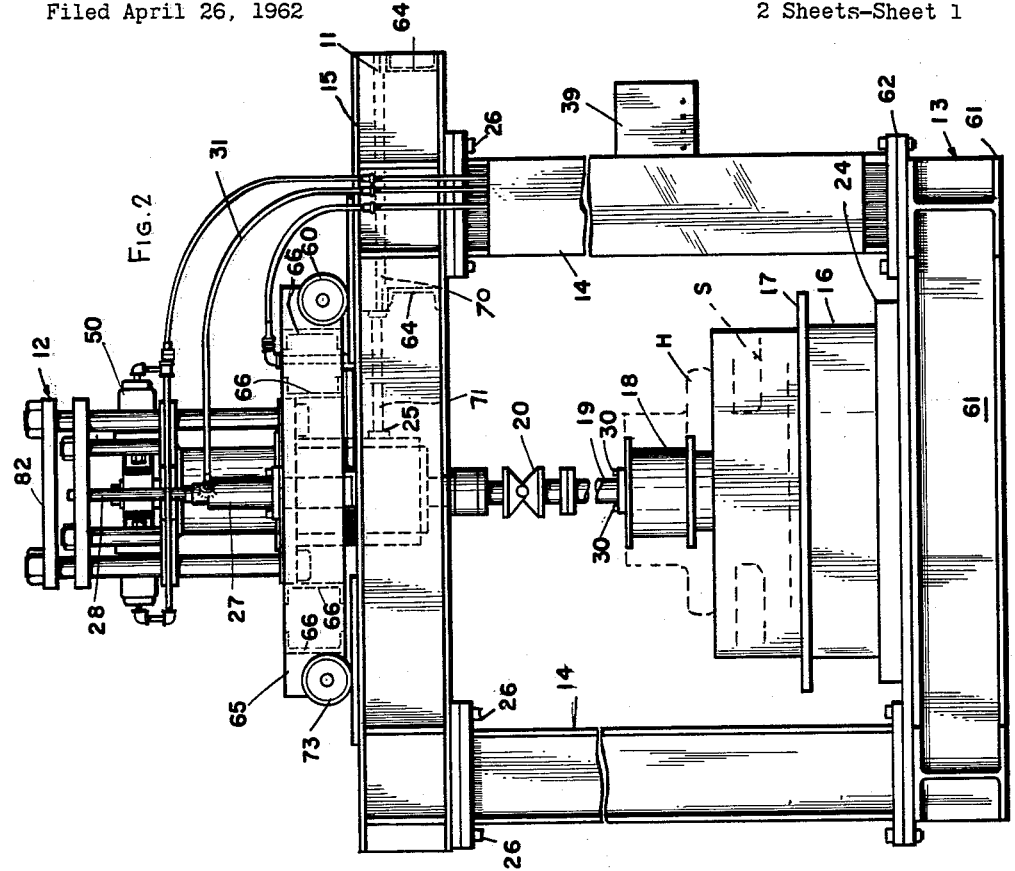
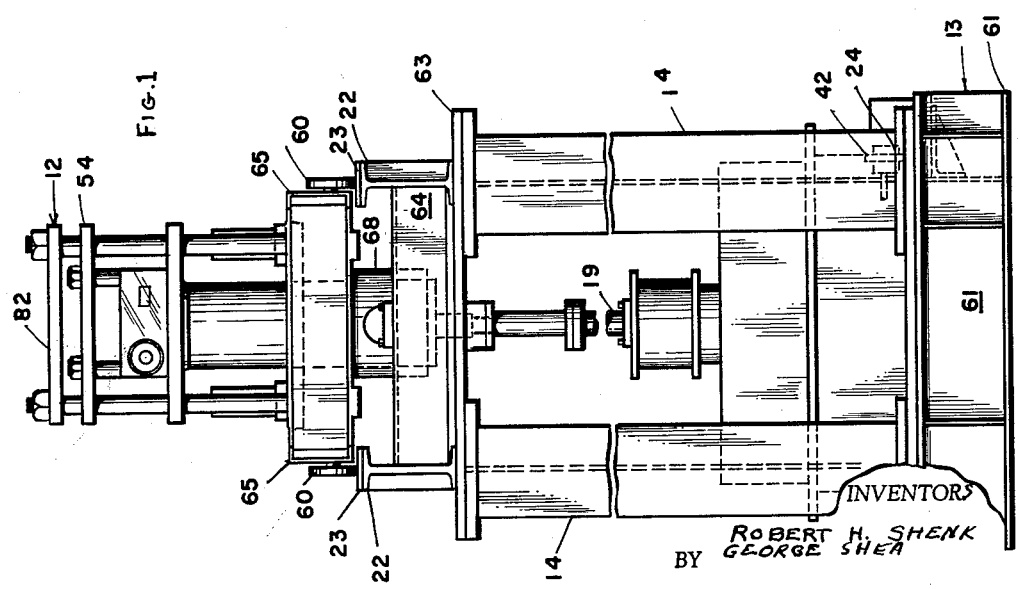
INVENTORS
ROBERT H. SHENK
GEORGE SHEA
BY
Charles L. Lovercheck
attorney Dec. 8, 1964  R. H. SHENK ETAL  3,159,946
LAPPING MACHINE Filed April 26, 1962  2 Sheets-Sheet 2

INVENTORS
ROBERT H. SHENK
GEORGE SHEA
BY
Charles L. Lovenbuck
attorney

> United States Patent Office 3,159,946
Patented Dec. 8, 1964

3,159,946
LAPPING MACHINE
Robert H. Shenk and George Shea, Erie, Pa., assignors to Zurn Industries, Inc., Erie, Pa., a corporation of Pennsylvania
Filed Apr. 26, 1962, Ser. No. 190,277
6 Claims. (Cl. 51—26)

This invention relates to lapping machines and, more particularly, to machines for lapping the engaging surfaces of mating gear teeth of flexible couplings.

It is often desirable and sometimes necessary to lap the teeth of gear couplings to eliminate tooth to tooth spacing errors created in the gear cutting operation as well as in the heat treatment process.

Prior machines for lapping gears generally operate with the coupling on a horizontal axis. The machine according to the present invention supports the coupling with the axis of its sleeve or externally toothed member generally vertical. This eliminates errors in grinding due to a difference in weight distribution of the coupling on the hub, resulting in differences in distribution of forces on certain teeth which result when the coupling is lapped in a horizontal position. Gear couplings of this type often have external teeth with crowned flanks and internal teeth with straight flanks.

Another advantage of the vertical position of the hub is that the lapping fluid is retained uniformly around the teeth by the tank, thus eliminating the need of an attendant as well as a supply tank and reservoir.

The machine disclosed herein laps the hub and sleeve teeth together using three motions of the hub relative to the sleeve:

(a) A rotary motion (under torque);
(b) An axial sliding motion; and
(c) A misalignment motion.

In other words, the machine practically "wears in" the coupling under conditions closely simulating the actual condition in service. The three motions are so related that the combination of positions does not reoccur and does not result in excessive lapping in any one particular area.

The base and frame of the machine are made of welded reinforced wide flange beams and plates. These beams and plates are stress relieved, machined, pinned, and bolted for a high degree of alignment and rigidity.

The trolley has a welded reinforced structural channel frame mounted on precision ground wheels fitted to the track on the machine frame. A hollow vertical shaft is supported by two journal type bearings with a solid inner shaft supported by two high thrust roller bearings thereon. An air operated brake applies torque to the rotating inner shaft.

Rotation is imparted to the rotary table by means of a hydraulic motor driving through a worm and worm gear. Torque is applied to the gear teeth being lapped by a brake mounted on the trolley. The teeth are lapped on one side at a time. The other side is lapped by reversing the direction of the rotary table. A reciprocating vertical motion of the trolley on its track is effected by means of two double acting hydraulic cylinders in parallel connected to the frame with their piston rods connected to the trolley. This motion is determined by the face widths of the gears being processed. The movement of the trolley on the track may be varied by adjusting the position of limit switches mounted on the trolley.

Lapping of the surfaces of ground gear teeth is accomplished by superimposing on the vertical reciprocating motion of the hub a reciprocating horizontal motion of the trolley by means of a double acting hydraulic cylinder. The magnitude of this motion is determined by the misalignment design of the gear teeth and the magnitude of reciprocation is controlled by adjusting the position of the limit switches on the frame.

Each motion is automatic and individually controlled as to magnitude, velocity, and direction by means of preset switches and valves.

Variations of surface finishes accomplished by the machine are controlled by velocities of the machine components, torque applied to the gear teeth, texture of the lapping compound, and time of operation.

The machine is designed to accommodate a variety of sizes and shapes of gears.

More specifically, it is an object of the present invention to provide an improved lapping machine.

Another object of the invention is to provide a lapping machine for gear couplings which is simple in construction, economical to manufacture, and simple and efficient in operation.

A still further object of the invention is to provide a lapping machine for flexible gear type couplings wherein the couplings are supported with their axes vertical during the lapping operation.

Yet a further object of the invention is to provide a lapping machine which exerts sliding misalignment and rotary motion to a coupling under load during lapping.

It is a further object of the invention to provide an improved lapping machine which simulates the motion to which a coupling is subjected when in actual use and, thus, actually wears in the coupling.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 1 is an end view of a lapping machine according to the invention;

FIG. 2 is a front view of the machine;

Figure 4:
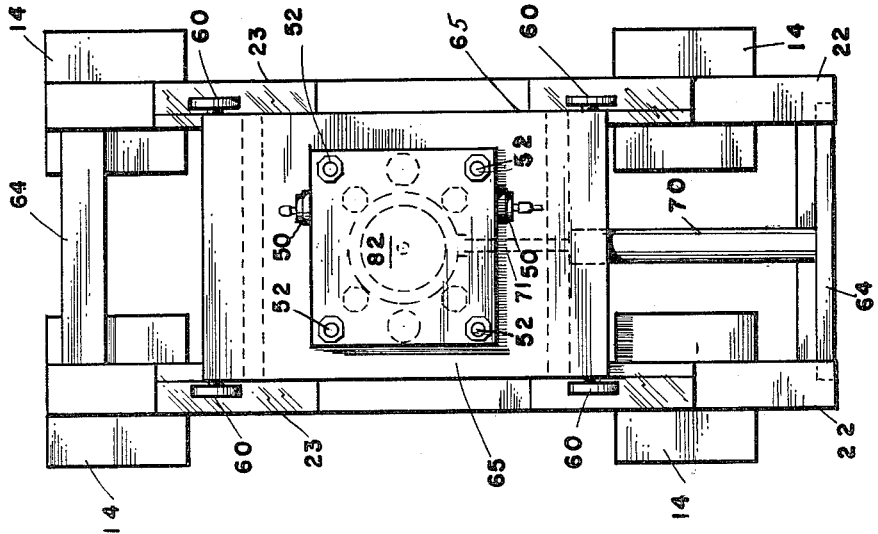
FIG. 4 is a top view of the machine.
Figure 3:
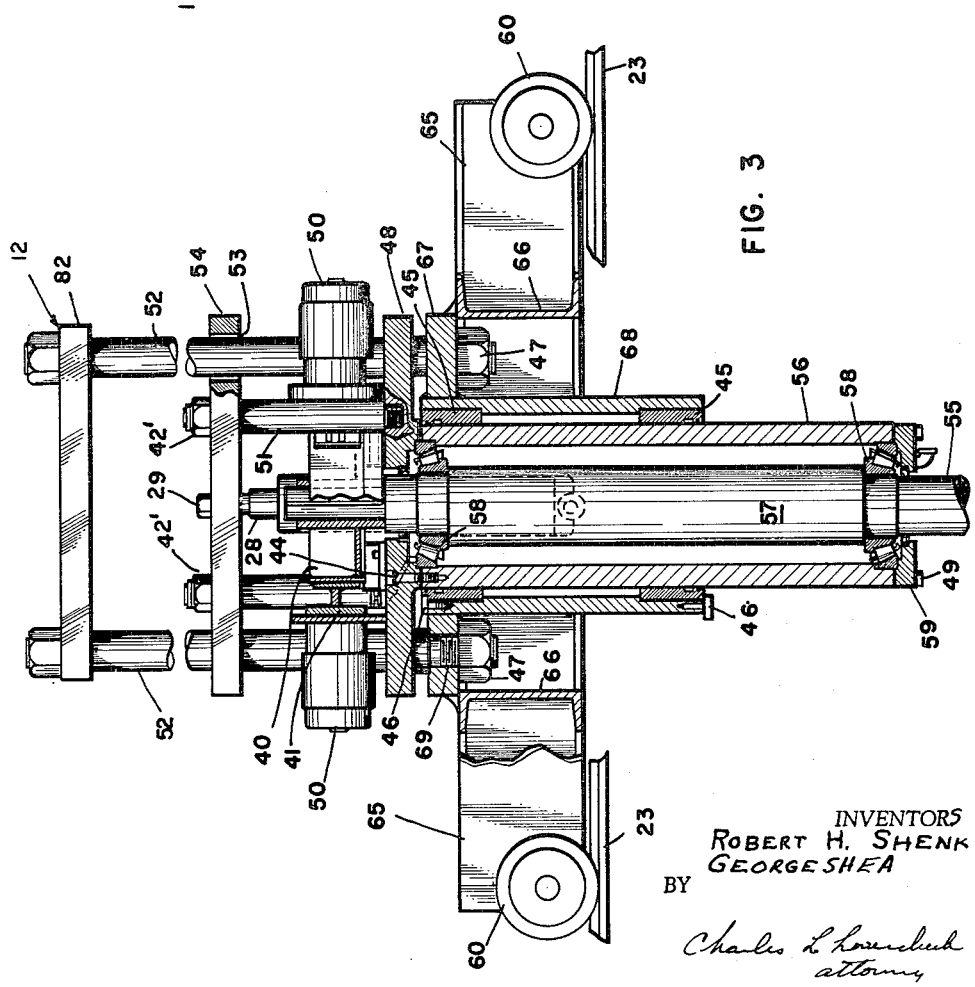
FIG. 3 is an enlarged cross sectional view of the machine taken on the central axis of FIG. 1.

Now with more particular reference to the drawings, the machine is made up generally of a frame with a base 13 which supports a rotary table for rotating the sleeve of a coupling. A track made up of I-beams 22 is supported above the base 13 by rigid columns 14.

A trolley assembly 12 is carried on wheels 60 and these wheels run on tracks. The trolley assembly carries a mechanism which supports the hub of the coupling to be lapped. The mechanism is made up of a downwardly extending quill shaft which supports the hub on the tracks and the trolley and mechanism mounted thereon give the quill shaft motions in three dimensions:

(a) The shaft is reciprocated up and down by cylinders 27 to give the hub sliding motion in the sleeve as the sleeve rotates the hub;

(b) The shaft is moved back and forth laterally as the trolley moves back and forth on the track; and (c) The driven sleeve driven by gears 42 rotates the coupling and, as the coupling rotates, a load is applied thereto by a brake air cylinder 50.

*The Frame and Base*

The frame and base are a rigid structure. The base 13 supports the track I-beams 22 on top of the columns 14, all of which are connected together rigidly to form a heavy rigid structure.

The base 13 is made up of structural H-sections 61 disposed at right angles to each other to form a rectangular enclosure. A heavy plate 62 is attached to the tops of the H-sections 61. This plate forms a platform to which the vertically extending columns 14 are attached and it also forms a support to carry a rotary table 16.

The upper ends of the columns 14 are fixed to plates 63 and the track beams 22 which are made of structural I-sections are fixed to the plates 63. Transverse angle members 64 have their ends fixed to the track beams 22. Wear plates 23 are attached to the tops of the track beams and these wear plates form surfaces on which the trolley wheels 60 roll.

The Trolley Assembly

The trolley assembly 12 supports the vertical reciprocating member and the brake assembly and it is reciprocated horizontally on the track beams 22 by a cylinder 70. The trolley is made up of spaced lateral frame members 65 which extend parallel to the track beams and have the trolley wheels 60 rotatably supported thereon at the four corners as shown.

Transverse structural angle members 66 are fixed at their ends to the lateral trolley frame members 65 and form with them a rigid frame structure. A plate 67 is fixed to the upper surfaces of the transverse angle members 66. The plate 67 has a rigid tubular bearing member 68 fixed thereto. Plate 67 also has holes 69 therein which receive the reduced size lower ends of columns 52. The reduced size ends of the columns have nuts 47 which rigidly fix the columns 52 to the plate 67.

The upper ends of the columns 52 are held together by a tie plate 82. Therefore, the trolley assembly made up of the frame, wheels 60, tubular member 68, columns 52, and tie plate 82 are all rigidly attached together and carried on the wheels 60.

The Quill Shaft

A quill shaft 55 is carried by the trolley assembly 12 and it reciprocates vertically on the trolley. The lower end of the quill shaft 55 is attached to a hub adapter 18 through a universal joint 20 and a spacer link 19. The quill shaft 55 is rotatably and reciprocably supported on the carriage by means of the tubular bearing member 68 which reciprocably receives a spindle 56. The quill shaft is rotatably supported in the spindle 56.

The quill shaft 55 has an enlarged portion 57 which defines a shoulder at each end thereof. Bearings 58 are held against these shoulders by means of a lower retainer plate 59 and an upper retainer plate 48. The lower retainer plate 59 is fixed to the spindle 56 by means of socket head cap screws 49 and the retainer plate 48 is held in place by means of studs 44. The spindle 56 is reciprocably supported in the tubular bearing member 68 by means of sleeve bearings 45 which are held in place by lock screws 46.

The retainer plate 48 which is fixed to the upper end of the spindle 56 by the studs 44 as aforesaid has threaded holes therein which receive the lower threaded ends of columns 51. The upper ends of the columns 51 have reduced size ends which extend through holes in upper plates 54. The columns 51 are locked to the upper plates 54 by means of lock nuts 42'. The upper plates 54 have holes 53 therein with suitable bushings which slidably receive the columns 52. Therefore, the spindle 56, retainer plate 48, columns 51, and upper plates 54 can reciprocate vertically as a unit. During reciprocation, the spindle 56 will slide without rotation in the sleeve bearings 45 and the plates 54 will slide over the columns 52.

A brake drum 40 is fixed to the upper end of the quill shaft 55 and it rotates with the quill shaft 55. The outer periphery of the brake drum is engaged by brake shoes 41 which are fixed to the piston rods of air cylinders 50. The spindle 56, retainer plate 48, and upper plates 54 are reciprocated by means of the air cylinders 27. The air cylinders 27 are fixed to the trolley frame at their lower ends and have piston rods 28 extending upwardly therefrom.

The piston rods 28 have a reduced size end which extends through holes in the upper plates 54. Nuts 29 fix the piston rods 28 to the upper plates 54. Hydraulic fluid or air is supplied to the cylinders 27 by line 31.

Operation

When the piston rod 28 in the cylinder 27 is moved upward, it carries with it the upper plates 54, columns 51, retainer plate 48, and the assembly, including spindle 56 and quill shaft 55. Thus, the quill shaft can be reciprocated up and down by the cylinder 27. The load on the hub can be controlled by controlling the pressure of fluid in the cylinders 50 which exert a force through the brake shoes or brake drum 40. The trolley can be moved back and forth by a fluid cylinder indicated at 70 which has a piston rod 71 attached thereto.

In the same manner, the up and down excursion of the quill shaft 55 can be controlled by limit switches which reverse the flow of fluid to the piston so that it continually reciprocates up and down. The flexible coupling to be lapped may be of the type shown in Patent No. 2,682,760.

The sleeve S of the flexible coupling will be clamped to a sleeve adapter 17 which is secured to rotary table 16. A hub H will be attached to the spacer link 19 with its axis of rotation extending generally vertically. The hub adapter 18 will then be lowered so that the teeth of the hub will be mated with the teeth of the sleeve S. The hub adapter 18 will be attached to the spacer link 19 by means of a socket cap screw 30. Suitable lapping fluid is put on the teeth of the coupling and the hydraulic mechanism is turned on to start the trolley oscillating back and forth on the track. Air pressure will be applied to impart the desired load by way of the cylinder 50 acting on the brake drum 40. The cylinder 27 is actuated to reciprocate the hub H up and down in the sleeve S.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A lapping machine for lapping crowned tooth couplings comprising a base, a frame extending upwardly from said base, means to support and rotate a first part of a crowned tooth coupling on said base, said frame having a horizontally disposed track spaced above said base, a trolley on said track above said base, means to reciprocate said trolley in a horizontal direction on said track, a quill shaft extending down from said trolley, means to attach a second part of said coupling to said quill shaft, a brake on said trolley, shoe means on said brake, means on said quill shaft to resist rotation of said quill shaft, and means on said trolley to reciprocate said quill shaft up and down.

2. A machine for wearing in flexible couplings having a first and a second part movable relative to each other comprising means to support a first part of said coupling with its central axis of rotation extending generally vertically, means to support said second part of said coupling, means on said machine to rotate said first part of said coupling, means to apply a predetermined force to said second part of said coupling to resist rotation, and means to swing the axis of rotation of said second part of said coupling laterally to force said second part of said coupling in and out of misalignment with said first part.

3. The machine recited in claim 2 wherein means is provided on said machine to reciprocate said second part of said coupling in a vertical direction during said rotation thereof.

4. A lapping machine for lapping crowned tooth couplings having a first and a second part comprising a base, a frame extending upwardly from said base, spaced track members supported above said base, said base and said track members being made of massive rigid constructural members, a trolley having wheels supported on said track members, a hydraulic cylinder attached to said frame and having a piston rod attached to said trolley for reciprocating said trolley on said track members, means on said base to support said first part of a coupling, means to rotate said first part on said base, a quill shaft supported on said trolley, means to reciprocate said quill shaft up and down on said trolley, a brake drum attached to said quill shaft, brake shoe means on said trolley, and means exerting a predetermined force on said brake shoe means whereby a predetermined load is exerted between said parts of said coupling.

5. The machine recited in claim 4 wherein said means to reciprocate said quill shaft comprises a hydraulic cylinder, and a piston with a piston rod in said cylinder attached to means attached to said quill shaft.

6. A machine for lapping flexible couplings comprising a base, means to support a part of a flexible coupling on said base, means on said base to rotate the part supported thereon, a frame extending upwardly from said base, a horizontal track attached to said frame, a trolley, column members extending upwardly from said trolley and fixed thereto, an upper plate having bores therein slidably received on said column members, a retainer plate, a quill shaft rotatably supported on said retainer plate and extending downwardly therefrom, said retainer plate being slidably received on said column members, a hydraulic cylinder affixed to said trolley and having a piston rod thereon fixed to said upper plate whereby said piston rod reciprocates said quill shaft up and down, a brake drum on said quill shaft, brake shoe means supported on said trolley for applying a predetermined load to said brake drum, means on said quill shaft for supporting a second part of a flexible coupling, and means to reciprocate said trolley on said track through a predetermined excursion.

References Cited in the file of this patent
UNITED STATES PATENTS

| | | |
|---|---|---|
| 1,120,278 | Carlson | Dec. 8, 1914 |
| 1,948,071 | Hofman et al. | Feb. 20, 1934 |
| 1,966,172 | Jackowski | July 10, 1934 |